United States Patent
Park et al.

(10) Patent No.: US 9,463,787 B2
(45) Date of Patent: Oct. 11, 2016

(54) START CLUTCH DEVICE

(71) Applicant: Hyundai Motor Company, Seoul (KR)

(72) Inventors: Jin Mo Park, Gwacheon-si (KR); Myoung Chul Lee, Bucheon-si (KR); Pan Seok We, Hwaseong-si (KR); Young Seok Son, Seoul (KR); Sung Woo Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 157 days.

(21) Appl. No.: 14/308,260

(22) Filed: Jun. 18, 2014

(65) Prior Publication Data

US 2015/0167619 A1    Jun. 18, 2015

(30) Foreign Application Priority Data

Dec. 18, 2013  (KR) .......................... 10-2013-0158787

(51) Int. Cl.
| | |
|---|---|
| *B60W 10/02* | (2006.01) |
| *B60W 10/10* | (2012.01) |
| *F16F 15/134* | (2006.01) |
| *F16D 25/0638* | (2006.01) |
| *F16D 25/12* | (2006.01) |

(52) U.S. Cl.
CPC .............. *B60W 10/10* (2013.01); *B60W 10/02* (2013.01); *F16D 25/0638* (2013.01); *F16D 25/123* (2013.01); *F16F 15/13469* (2013.01); *Y10T 477/641* (2015.01)

(58) Field of Classification Search
None
See application file for complete search history.

(56) References Cited

U.S. PATENT DOCUMENTS

| | | | | |
|---|---|---|---|---|
| 5,526,714 | A | * | 6/1996 | Schierling ............. F16D 69/025 192/107 M |
| 2002/0177502 | A1 | * | 11/2002 | Kobayashi .............. F16H 3/089 475/200 |
| 2005/0205382 | A1 | | 9/2005 | Tryon et al. |
| 2007/0267265 | A1 | * | 11/2007 | Sudau ................. F16D 25/0638 192/53.1 |
| 2011/0088989 | A1 | | 4/2011 | Agner |

FOREIGN PATENT DOCUMENTS

| | | |
|---|---|---|
| JP | 2003-262236 A | 9/2003 |
| JP | 2009-243597 A | 10/2009 |
| JP | 4428906 B2 | 12/2009 |
| JP | 5401821 B2 | 1/2014 |
| KR | 10-2004-0020969 A | 3/2004 |
| KR | 10-2011-0046151 A | 5/2011 |

* cited by examiner

*Primary Examiner* — Edwin A Young
(74) *Attorney, Agent, or Firm* — Morgan, Lewis & Bockius LLP

(57) ABSTRACT

A start clutch device transmits rotational power of an engine to a side of a transmission via a damper through a clutch inside a housing. The start clutch device includes a transmission input shaft, an output hub and a fixed hub unit. The transmission input shaft is connected to the transmission, and the output hub surrounds the transmission input shaft inside the housing such that rotation relative to the transmission input shaft is restrained. The output hub is coupled with the damper such that the output hub transmits the rotational power to the transmission input shaft. A fluid passes through the fixed hub unit, in which one end portion divides a space between an inner circumference of the housing and an outer circumference of the transmission input shaft, thereby defining a flow path, and the other end portion supports the output hub in the axial direction.

6 Claims, 2 Drawing Sheets

START CLUTCH DEVICE

CROSS REFERENCE TO RELATED APPLICATION

The present application claims priority of Korean Patent Application Number 10-2013-0158787 filed on Dec. 18, 2013, the entire contents of which application are incorporated herein for all purposes by this reference.

BACKGROUND OF INVENTION

1. Field of Invention

The present invention relates to a start clutch device, and more particularly, to a start clutch device in which oil circulation paths are separated from each other and expanded inside a housing in order to realize lubricating and cooling performance while increasing the axial supporting force of components which are disposed inside the housing.

2. Description of Related Art

A torque converter is typically used as a start clutch device of a vehicle, in particular, as a start device of a vehicle having an automatic transmission (AT), a continuously variable transmission (CVT) or an automated manual transmission (AMT). The torque converter maintains a driving source in the rotating state by allowing relative rotation between an input shaft of a transmission and an engine output shaft via a fluid coupling in a stopped state of a vehicle.

Thus, at the start of a vehicle, the relative rotation between the engine output shaft and the input shaft of the automatic transmission is allowed and smooth and soft start performance is realized through the lubricating action of the fluid and the enhancement of torque. However, a power loss is caused by the slipping of the fluid, thereby lowering fuel efficiency.

Recently, as the number of stages of automatic transmissions is increasing, the output torque and power of an engine are increasing, and a small size of automatic transmissions is required, start clutch devices that do not use fluid have been proposed.

In the meantime, FIG. 1 shows a start clutch device of the related art which does not use a torque converter. This start clutch device was disclosed in Korean Patent Application Publication No. 10-2004-0020969, titled "START CLUTCH DEVICE." That is, a clutch 10 including a friction material 14 and a piston 20 and a damper device 12 are disposed inside a housing 2. The housing 2 is connected to an engine, and is disposed such that it can rotate using rotational power supplied from the engine.

However, according to this approach, gaps a and b provided in the inner and outer radius directions of a sleeve shaft 41 are very narrow such that oil does not properly circulate inside the housing, which is problematic.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art and/or other problems, and the present invention is intended to provide a start clutch device in which oil circulation paths are separated from each other and expanded inside a housing in order to realize lubricating and cooling performance while increasing the axial supporting force of components which are disposed inside the housing.

In order to solve the above problems and/or other problems, according to various aspects of the present invention, there is provided a start clutch device which transmits rotational power of an engine to a side of a transmission via a damper through connecting and disconnecting operations of a clutch which is disposed inside a housing. The start clutch device may include: a transmission input shaft which is connected to the side of the transmission so as to transmit the rotational power to the transmission; an output hub surrounding the transmission input shaft inside the housing, wherein the output hub is disposed in a state in which rotation relative to the transmission input shaft is restrained, and one end of the output hub is coupled with one end of the damper such that the output hub transmits the rotational power of the engine to the transmission input shaft; and a fixed hub unit. A fluid passes through the fixed hub unit. One end portion of the fixed hub unit is disposed so as to divide a space between an inner circumference of the housing and an outer circumference of the transmission input shaft, thereby defining a flow path through which the fluid is to be supplied into the housing. The other end portion of the fixed hub unit is configured to support the output hub in an axial direction toward the transmission input shaft between an inner edge of the housing and the output hub.

According to an aspect of the present invention, the fixed hub unit may include: a sleeve shaft surrounding the transmission input shaft, wherein the sleeve shaft has a first flow path at an outer diameter side and a second flow path at an inner diameter side; and a fixed hub, wherein one end of the fixed hub is disposed such that rotation relative to the sleeve shaft is restrained, and both surfaces of the other end of the fixed hub are respectively supported on inner surfaces of the output hub and the housing.

A region between the fixed hub and the output hub and a region between the fixed hub and the inner surface of the housing may be respectively supported by bearings. The output hub may have a through-hole formed at a position that communicates with the second flow path. The transmission input shaft may have defined a third flow path therein through which the fluid is supplied into the housing. The third flow path may communicate with the second flow path.

According to the present invention, the first and second flow paths are separately formed at the inner diameter side and the outer diameter side of the sleeve shaft, and the third flow path is additionally formed at the transmission input shaft. This consequently facilitates the smooth flow of fluid that enters the housing and circulates through the housing, thereby improving the actions of lubricating and cooling friction elements for the operation of the clutch.

In addition, since the region between the inner surface of the housing and the output hub is firmly supported via the fixed hub, the components inside the housing that rotate as being coupled with the output shaft are firmly aligned in the axial direction, thereby minimizing reasons for noise and vibration that would occur during the operation.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
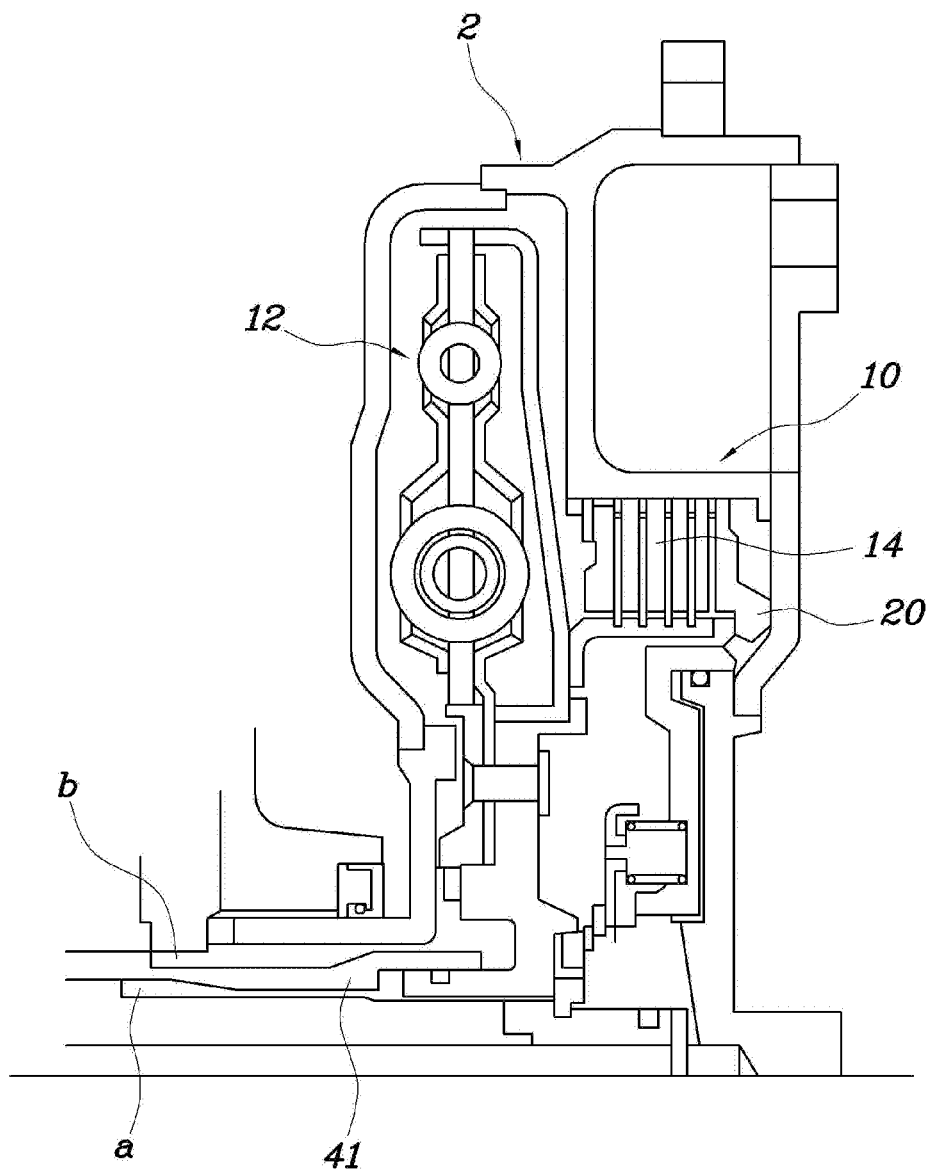
FIG. 1 is a view illustrating the inner structure of a start clutch device of the related art.
Figure 2:
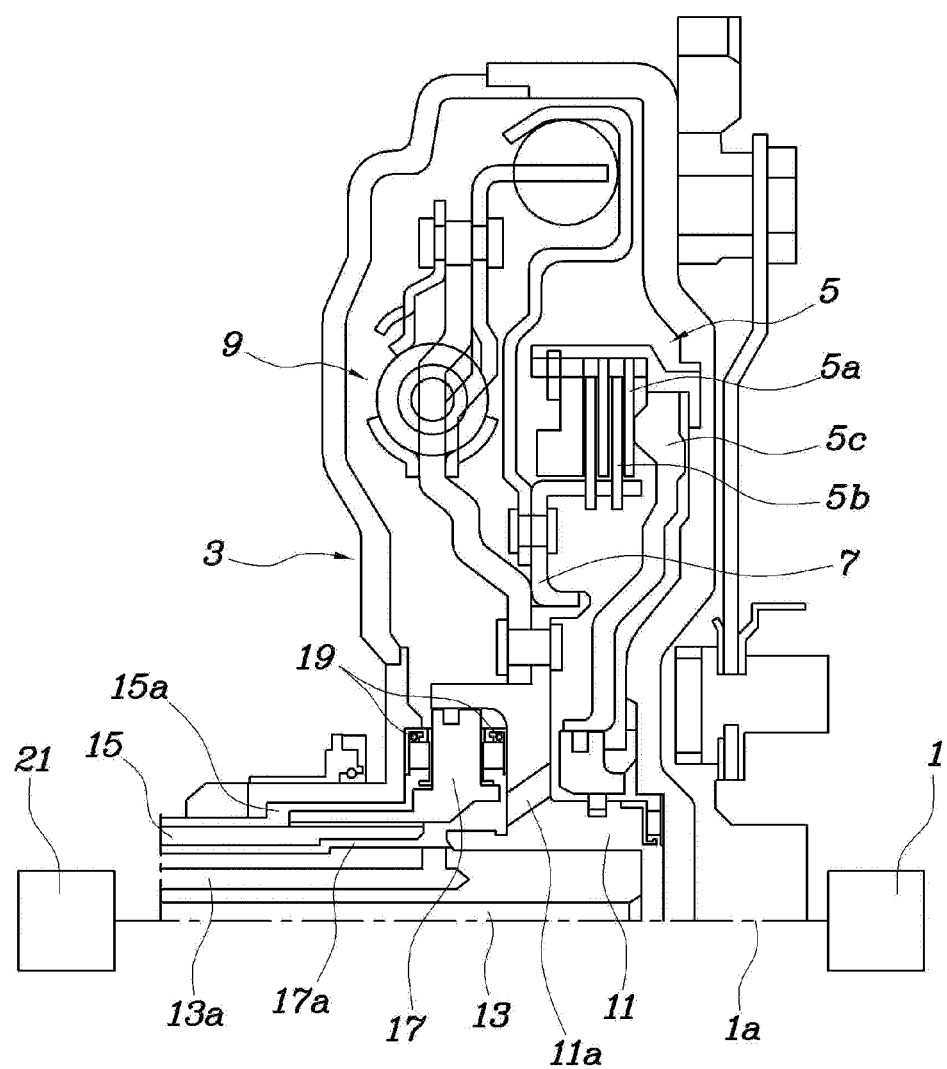
FIG. 2 is a view illustrating the inner structure of an exemplary start clutch device according to the present invention.

FIG. 2 is a view illustrating the inner structure of a start clutch device according to various embodiments of the present invention. The start clutch device of the present invention generally includes a transmission input shaft 13, an output hub 11 and a fixed hub unit.

Describing the present invention in detail with reference to FIG. 2, the start clutch device of the present invention is configured such that it transmits rotational power of an engine 1 to a side of a transmission 21 via a damper 9 through the connecting and disconnecting operations of a clutch 5 which is disposed inside a housing. In the start clutch device, the transmission input shaft 13 is connected to the side of the transmission 21 so as to transmit the rotational power to the transmission 21.

The output hub 11 is configured such that it surrounds the transmission input shaft 13 inside the housing 3, and is disposed in the state in which rotation relative to the transmission input shaft 13 is restrained. One end of the output hub 11 is coupled with one end of the damper 9 such that the output hub 11 transmits the rotational power of the engine 1 to the transmission input shaft 13.

The fixed hub unit is configured such that the fluid passes therethrough. One end portion of the fixed hub unit is disposed so as to divide the space between the inner circumference of the housing 3 and the outer circumference of the transmission input shaft, thereby defining a flow path through which fluid is to be supplied into the housing 3. The other end portion of the fixed hub unit is configured to support the output hub 11 in the axial direction toward the transmission input shaft 13 between the inner edge of the housing 3 and the output hub 11.

That is, an engine output shaft 1a is connected to the engine 1 and one end of the housing 3, the other end of the housing 3 is supported on the transmission 21, and the clutch 5 and the damper 9 are disposed inside the housing 3.

The clutch 5 can be a wet clutch, and includes a plurality of first friction elements 5a, a second friction element 5b and a piston 5c. Specifically, the clutch 5 is engaged through the friction between the plurality of the first friction elements 5a and the second friction element 5b. The first friction elements 5a are connected to the housing 3 so as to rotate therewith. The second friction element 5b is connected to a clutch hub 7 such that it can rotate relative to the first friction elements 5a, and is connected to the transmission input shaft 13. The piston 5c causes the first friction elements 5a and the second friction element 5b into close contact with each other through hydraulic pressure, thereby transmitting power.

In addition, the damper 9 including an elastic element (e.g. a compression spring) can be one or more dampers that are disposed in the radial direction. One end of the damper 9 is connected to the clutch hub 7 connected to the second friction element 5b, and the other end of the damper 9 is connected to the output hub 11, thereby improving noise, vibration and harshness (NVH) due to torsional vibration transferred from the engine 1 when the clutch 5 is engaged.

Furthermore, the inner circumference of the output hub 11 is spline-connected to the outer circumference of the transmission input shaft 13 such that rotation relative to each other is restrained.

In addition, the flow path between the inner circumference of the housing 3 and the outer circumference of the transmission input shaft 13 which is divided by the fixed hub unit is connected to an oil path inside the transmission.

Here, the fixed hub unit includes a sleeve shaft 15 and a fixed hub 17. The sleeve shaft 15 is configured such that it surrounds the transmission input shaft 13, has a first flow path 15a at an outer diameter side and has a second flow path 17a at an inner diameter side. One end of the fixed hub 17 is disposed such that rotation relative to the sleeve shaft 15 is restrained, and both surfaces of the other end of the fixed hub 17 are respectively supported on the inner surfaces of the output hub 11 and the housing 3.

Here, the inner circumference of the sleeve shaft 15 can be spline-connected to the outer circumference of the fixed hub 17 such that rotation relative to each other is restrained. The sleeve shaft 15 (or the inner circumference of the sleeve shaft 15) can be supported on the transmission 21 in an airtight state.

Specifically, since the first flow path 15a and the second flow path 17a are separately formed at the outer diameter side and the inner diameter side of the sleeve shaft 15, fluid (e.g., oil) that has passed through the first flow path 15a and the second flow path 17a enters the housing 3 and circulates through the inside of the housing 3 after having passed between the housing 3 and the fixed hub 17. Thus, the actions of lubricating and cooling the friction elements for the operation of the clutch 5 become more efficient.

In addition, since the region between the inner surface of the housing 3 and the output hub 11 is firmly supported via the fixed hub 17, components inside the housing 3 that rotate as being coupled with the output hub 11 are firmly aligned in the axial direction, thereby minimizing reasons for noise and vibration that would occur during the operation.

According to various embodiments of the present invention, bearings 19 can be disposed between the fixed hub 17 and the output hub 11 and between the fixed hub 17 and the inner surface of the housing 3. In some embodiments, it is preferred that the bearings 19 be implemented as thrust bearings.

That is, since the region between the fixed hub 17 and the inner surface of the housing 3 is supported by the bearings 19, fluid supplied through the first flow path 15a and the second flow path 17a can be smoothly and efficiently supplied into the housing 3 by passing through the bearing 19.

According to various embodiments of the present invention, a through-hole 11a can be formed in the output hub 11 at a position that communicates with the second flow path 17a. Specifically, the flow that is directed into the housing 3 through the second flow path 17a is introduced through the through-hole 11a and then is directly introduced toward the clutch 5, thereby improving the lubricating and cooling performance of friction elements of the clutch 5.

According to various embodiments of the present invention, a third flow path 13a can be formed inside the transmission input shaft 13 such that fluid can be supplied into the housing 3. Specifically, one end of the third flow path 13a can communicate with the second flow path 17a.

Since the third flow path 13a is additionally formed in the transmission input shaft 13, fluid introduced through the second flow path 17a as well as fluid introduced through the third flow path 13a is added so as to smoothen or effectuate a flow of fluid that enters the housing 3 and circulates through the inside of the housing 3. This consequently improves the actions of lubricating and cooling the friction elements for the operation of the clutch 5.

For convenience in explanation and accurate definition in the appended claims, the terms "upper" or "lower", "inner" or "outer", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A start clutch device which transmits rotational power of an engine to a side of a transmission via a damper through connecting and disconnecting operations of a clutch which is disposed inside a housing, the start clutch device comprising:

a transmission input shaft connected to the side of the transmission to transmit the rotational power to the transmission;

an output hub surrounding the transmission input shaft inside the housing, wherein the output hub is disposed in a state in which rotation relative to the transmission input shaft is restrained, and one end of the output hub is coupled with one end of the damper such that the output hub transmits the rotational power of the engine to the transmission input shaft; and a fixed hub unit, wherein a fluid passes through the fixed hub unit, a first end portion of the fixed hub unit is disposed so as to divide a space between an inner circumference of the housing and an outer circumference of the transmission input shaft, thereby defining a flow path through which the fluid is to be supplied into the housing, and a second end portion of the fixed hub unit is configured to support the output hub in an axial direction toward the transmission input shaft between an inner edge of the housing and the output hub.

2. The start clutch device according to claim 1, wherein the fixed hub unit comprises:

a sleeve shaft surrounding the transmission input shaft, wherein the sleeve shaft has a first flow path at an outer diameter side and a second flow path at an inner diameter side; and a fixed hub, wherein a first end of the fixed hub is disposed such that rotation relative to the sleeve shaft is restrained, and both surfaces of a second end of the fixed hub are respectively supported on inner surfaces of the output hub and the housing.

3. The start clutch device according to claim 2, wherein a region between the fixed hub and the output hub and a region between the fixed hub and the inner surface of the housing are supported by bearings.

4. The start clutch device according to claim 2, wherein the output hub has a through-hole formed at a position that communicates with the second flow path.

5. The start clutch device according to claim 2, wherein the transmission input shaft has defined a third flow path therein through which the fluid is supplied into the housing.

6. The start clutch device according to claim 5, wherein the third flow path communicates with the second flow path.

* * * * *